UNITED STATES PATENT OFFICE.

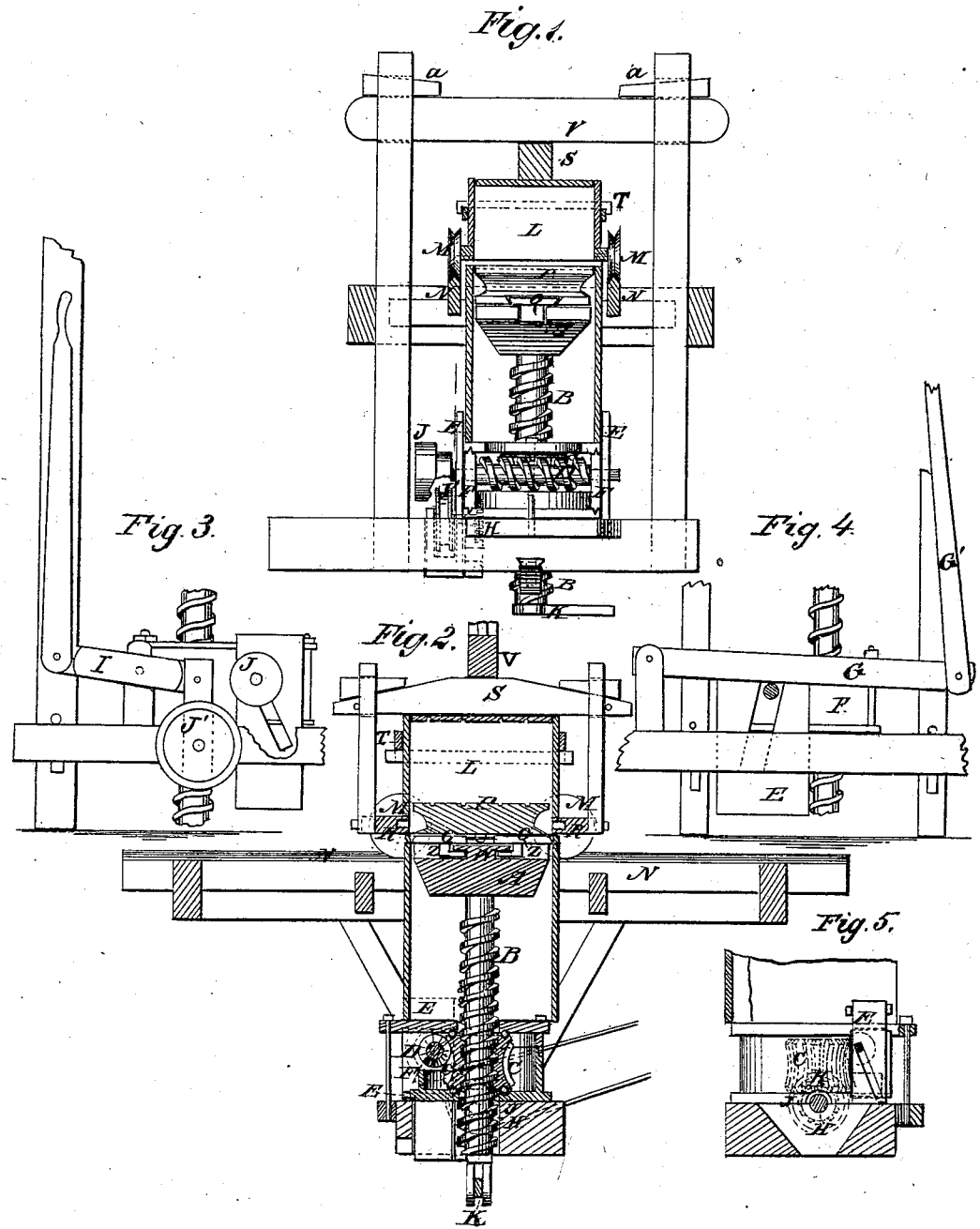

JAMES H. DAVIS AND WILLIAM WHITE, WINNSBOROUGH, TEXAS.

IMPROVEMENT IN COTTON-PRESSES.

Specification forming part of Letters Patent No. 183,378, dated October 17, 1876; application filed April 25, 1876.

*To all whom it may concern:*

Be it known that we, JAMES H. DAVIS and WILLIAM WHITE, of Winnsborough, in the county of Wood and State of Texas, have invented a new and Improved Press for Cotton, Hay, &c., of which the following is a specification:

Our invention consists of a contrivance for driving the screw, which works the follower by a worm when doing the work, and a toothed wheel when returning the follower; also, of a removable case which receives the pressed bale and carries it away on a truck to be tied, while another box takes its place to receive the next bale, all as hereinafter described.

Figure 1 is a sectional elevation of our improved press. Fig. 2 is another section taken at right angles to Fig. 1, and Figs. 3, 4, 5 are detail views.

The follower A is supported upon and operated by a screw, B, which passes through and is in turn operated by a nut, C. The latter is provided with teeth exteriorly to adapt it to mesh with and be rotated by a worm-shaft, D, which is arranged transversely or at right angles to the screw B. This worm-shaft is brought into and removed from engagement with the nut C by means of vertically-adjustable plates E, having inclined slots in which the ends of the shaft work. The bearings or supports of the shaft are on the vertical parallel plates F, which slide horizontally in suitable ways or grooves, Fig. 1. When the plates E are raised, the shaft D is moved away from the nut C, and when they are lowered, it is moved toward the nut. The means for operating or adjusting the said plates is a lever, G, which is attached to one of them, and provided with a pivoted arm or handle, G', Fig. 4. The function of the screw is to run the follower up, but for running it down a more quickly-operating device is required, and hence we employ a bevel-gear, H, for that purpose. Said gear is raised and lowered by a lever, I, to bring it into and out of engagement with the lower toothed edge of the nut or gear C. A band-pulley, J, is attached to the worm-shaft D, and a like pulley, J', to the shaft of gear H, so that the same may be constantly rotated.

The screw carries an arm, K, on its lower end, which raises the slides E by taking against a cross-piece connecting their lower ends, and throws the worm out of gear when the follower has been raised to the height required. L is a box to receive the pressed matters, mounted on wheels M to run along the track and carry the pressed bale away from over the follower for tying, and discharging while the lower portion of the press-box is being filled for another bale to be pressed. To secure the bale in the box so that it can be moved away, a false follower, P, is employed, having spring-stops Q, which slide into notches R in the bottom of the box-frame, and hold it while the bale is carried away and tied.

The box has a strong beam, S, tenoned in slots of the vertical bars T to confine the pressed bale after it is secured in the box. While the bale is being pressed into the box the top beam S of the latter bears against the cross-beam V of the press-frame; but when the pressing operation is completed, the wedges a, which hold down and confine the beam V, are removed from the slots in which the tenoned ends of the beam V are fitted, and the box L thereby released, so that it can be readily rolled along on the rails N.

The clutches Q engage with the T-shaped studs W of follower A by the hooked projections Z, to connect the false follower when the other goes down to open the case for filling.

Having thus described our invention, what we claim as new, and desire to secure by Letters Patent, is—

1. The combination, with the nut C and screw B of a screw-press, of a worm, D, for driving the follower home, and a gear-wheel, H, for returning it, mounted in adjustable bearings for gearing and ungearing with the nut, substantially as specified.

2. The combination of the arm K, screw B, slides E, and the worm, as shown and described.

3. The combination, with the false follower P, adapted to be relieved from follower A, of the movable upper press-box L, as described, and having wheels M and cross-bar V, all as shown and described, to operate as specified.

4. The catches Q of false follower P, having hooked projections Z, in combination with the T-shaped studs W of follower A, substantially as specified.

JAMES HARVEY DAVIS.
WILLIAM WHITE.

Witnesses:
T. N. SKEEN,
E. M. JACKSON.